US011970230B1

(12) United States Patent
Ng et al.

(10) Patent No.: US 11,970,230 B1
(45) Date of Patent: Apr. 30, 2024

(54) TOOL ASSEMBLY AND A METHOD FOR MOUNTING A TAILGATE TO A CAR BODY USING THE TOOL ASSEMBLY

(71) Applicant: Honda Motor Co., Ltd., Tokyo (JP)

(72) Inventors: Marco kar-ki Ng, Alliston (CA); Joseph Marshall Sacerty, Wasaga Beach (CA); Kristopher Zalewski, Orillia (CA); Khoi Nguyen, Newmarket (CA); Ruben Zhou Yang, Hamilton (CA); Bahman Sayahfar, Richmond Hill (CA)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/187,519

(22) Filed: Mar. 21, 2023

(51) Int. Cl.
   B62D 65/06 (2006.01)
   B23P 19/06 (2006.01)
   (Continued)

(52) U.S. Cl.
   CPC ............ *B62D 65/06* (2013.01); *B23P 19/067* (2013.01); *B62D 25/087* (2013.01); *B62D 25/105* (2013.01); *B62D 25/12* (2013.01); *B23P 19/06* (2013.01); *B23P 21/008* (2013.01); *B23P 2700/50* (2013.01); *B25B 23/105* (2013.01); *B60Y 2200/11* (2013.01); *B60Y 2304/07* (2013.01); *B60Y 2400/30* (2013.01); *B60Y 2400/41* (2013.01); *Y10T 29/24* (2015.01); *Y10T 29/49622* (2015.01); *Y10T 29/49902* (2015.01); *Y10T 29/53417* (2015.01); *Y10T 29/53913* (2015.01)

(58) Field of Classification Search
   CPC ........ B62D 65/06; B23P 19/06; B23P 19/067; B23P 21/008; B23P 2700/50; B25B 23/105; Y10T 29/24; Y10T 29/49622; Y10T 29/49902; Y10T 29/53417; Y10T 29/53913
   See application file for complete search history.

(56) References Cited

U.S. PATENT DOCUMENTS 5,283,937 A * 2/1994 Uesugi .................. B62D 65/06
                                                             29/281.5
6,239,926 B1   5/2001 De Shazer
(Continued)

FOREIGN PATENT DOCUMENTS

CN       103612990 A     3/2014
CN       204457215 U     7/2015
(Continued)

*Primary Examiner* — Jermie E Cozart
(74) *Attorney, Agent, or Firm* — Joshua Freier; American Honda Motor Co., Inc.

(57) ABSTRACT

A tool assembly for mounting a tailgate to a car body is provided. The tool assembly includes a bracket adapted to engage with an overhead structure and a frame movably coupled to the bracket and configured to move in a vertical direction relative to the bracket. The tool assembly also includes a linkage mechanism movably coupling the frame with the bracket and configured to maintain the frame parallel to the bracket during the vertical movement of the frame. Further, a pair of torque guns is coupled to the frame and is configured to hold a pair of fasteners. The pair of torque guns engages and tightens the pair of fasteners to the car body and a hinge attached to the tailgate.

15 Claims, 5 Drawing Sheets

(51) Int. Cl.
  *B23P 21/00*   (2006.01)
  *B62D 25/08*   (2006.01)
  *B62D 25/10*   (2006.01)
  *B62D 25/12*   (2006.01)
  *B25B 23/10*   (2006.01)

(56) References Cited

U.S. PATENT DOCUMENTS

| | | | |
|---|---|---|---|
| 2007/0253799 A1* | 11/2007 | O'Connell | B25J 17/0216 |
| | | | 414/222.01 |
| 2008/0121601 A1 | 5/2008 | Ehrenleitner | |
| 2015/0167731 A1* | 6/2015 | Kumar | F16M 11/14 |
| | | | 29/402.01 |

FOREIGN PATENT DOCUMENTS

| | | | |
|---|---|---|---|
| CN | 102718120 B | | 12/2015 |
| CN | 104444802 B | * | 7/2016 |
| CN | 208473522 U | | 2/2019 |
| CN | 107009858 B | | 5/2019 |
| CN | 209482983 U | | 10/2019 |
| CN | 108098670 B | | 12/2020 |
| CN | 212828778 U | | 3/2021 |
| DE | 102011118824 A1 | | 5/2013 |
| JP | 2004026055 A | | 1/2004 |
| JP | 4056960 B2 | | 3/2008 |
| KR | 19990010423 U | | 3/1999 |
| KR | 100534403 B1 | | 12/2005 |
| KR | 20070042680 A | | 4/2007 |
| KR | 101660761 B1 | | 9/2016 |

* cited by examiner

TOOL ASSEMBLY AND A METHOD FOR MOUNTING A TAILGATE TO A CAR BODY USING THE TOOL ASSEMBLY

BACKGROUND

The disclosed subject matter relates generally to a tool assembly. More particularly, the disclosed subject matter relates to a tool assembly for mounting a tailgate with a pair of hinges to a car body at a manufacturing plant and a method thereof.

In the current method of production of vehicles, a tailgate is mounted to car body by installing/mounting hinges to a car body, and then securing the tailgate to the hinges. However, installing or mounting the tailgate to the hinges restricts the ability to adjust the tailgate relative to the car body during the mounting/installation process. Further, installing the tailgate to the hinges mounted on the car body results into alignment of the tailgate with hinges rather than the car body, resulting into uneven gaps between the tailgate and the car body, which is undesirable.

Moreover, currently the hinges are mounted to the car body using a torque gun and as the hinges are mounted to the roof of the car body, a technician needs to use either an elevated platform or a ramp to install the hinges to the car body. Moreover, there is no mechanism to guide the technician to correctly align the fasteners with the holes of the hinges and the car body, which is undesirable

SUMMARY

In accordance with one embodiment of the present disclosure, a tool assembly for mounting a tailgate to a car body is provided. The tool assembly includes a bracket adapted to engage with an overhead structure, and a frame movably coupled to the bracket and configured to move in a vertical direction relative to the bracket. The tool assembly also includes a linkage mechanism movably coupling the frame with the bracket. The linkage mechanism is configured to maintain the frame parallel to the bracket during the vertical movement of the frame. Further, the tool assembly includes a pair of torque guns coupled to the frame and configured to hold a pair of fasteners. The pair of torque guns engages and tightens the pair of fasteners to the car body and a hinge attached to the tailgate.

In accordance with another embodiment of the present disclosure, a method for mounting a tailgate to a car body is disclosed. The method includes attaching a hinge to an upper end of the tailgate, and arranging the tailgate at a rear of the car body such that the tailgate is arranged covering a rear opening the car body. The method further includes coupling, by using a tool assembly, the tailgate with car body. The tailgate is coupled to the car body by engaging, by using the tool assembly, a pair of fasteners to the hinge and the car body. The tool assembly includes a bracket adapted to engage with an overhead structure, and a frame movably coupled to the bracket and configured to move in a vertical direction relative to the bracket. The tool assembly also includes a linkage mechanism movably coupling the frame with the bracket. The linkage mechanism is configured to maintain the frame parallel to the bracket during the vertical movement of the frame. Further, the tool assembly includes a pair of torque guns coupled to the frame and configured to hold the pair of fasteners. The pair of torque guns engages and tightens the pair of fasteners with the hinge and the car body.

In accordance with yet a further embodiment of the present disclosure, a tool assembly for mounting a tailgate to a car body is disclosed. The tool assembly includes a bracket adapted to engage with an overhead structure, and a frame movably coupled to the bracket and configured to move in a vertical direction relative to the bracket. The tool assembly also includes a linkage mechanism movably coupling the frame with the bracket. The linkage mechanism is configured to maintain the frame parallel to the bracket during the vertical movement of the frame. The tool assembly further includes a pair of torque guns coupled to the frame and configured to hold a pair of fasteners. The pair of torque guns engages and tighten the pair of fasteners with the car body and a hinge attached to the tailgate. Moreover, the tool assembly includes a mirror attached to the frame and configured provide a view of the hinge, the car body and the pair of fasteners to facilitate an alignment of the pair of fasteners with the hinge and the car body to enable the engagement of the pair of fasteners with the hinge and the car body.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-5, wherein like numbers indicate the same or corresponding elements throughout the views.

Figure 1:
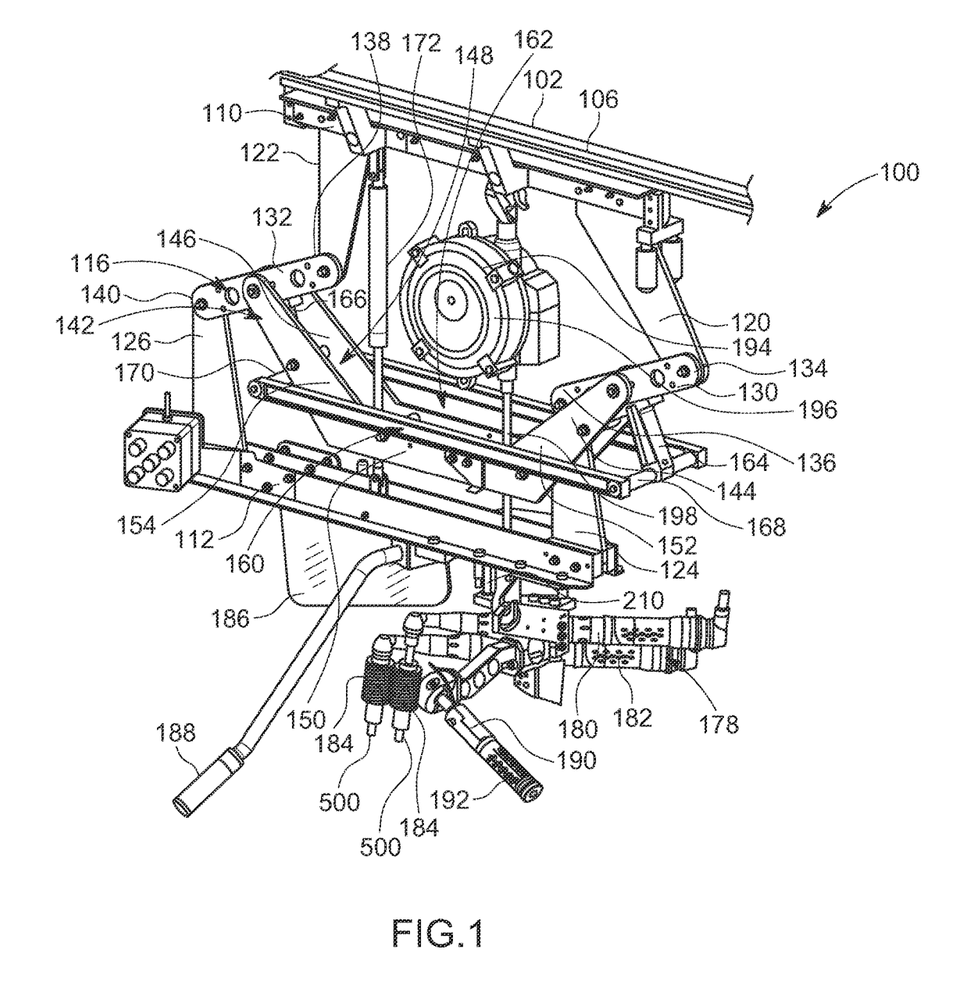
FIG. 1 is a perspective view depicting a tool assembly, in accordance with one embodiment of the present disclosure.
Figure 4:
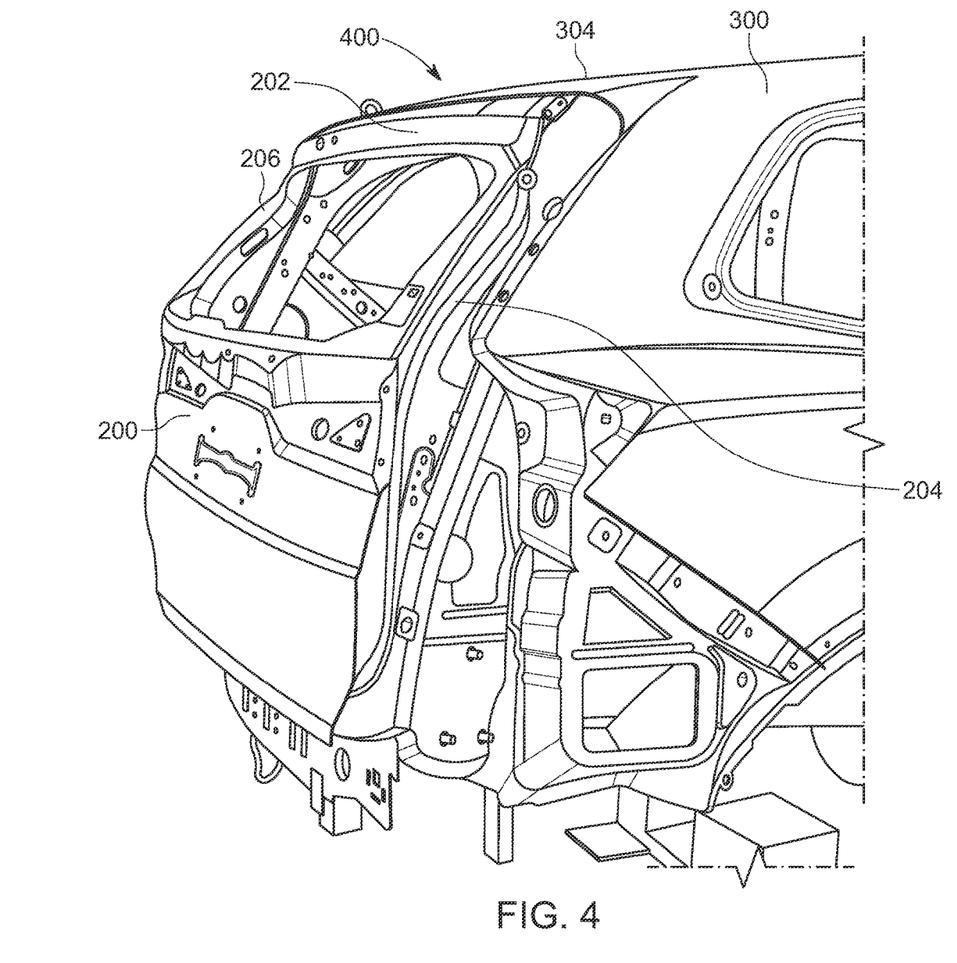
FIG. 4 is a perspective view of a rear portion of the car body with the tailgate arranged at a rear of the car body, in accordance with the concepts of the present disclosure.
Figure 5:
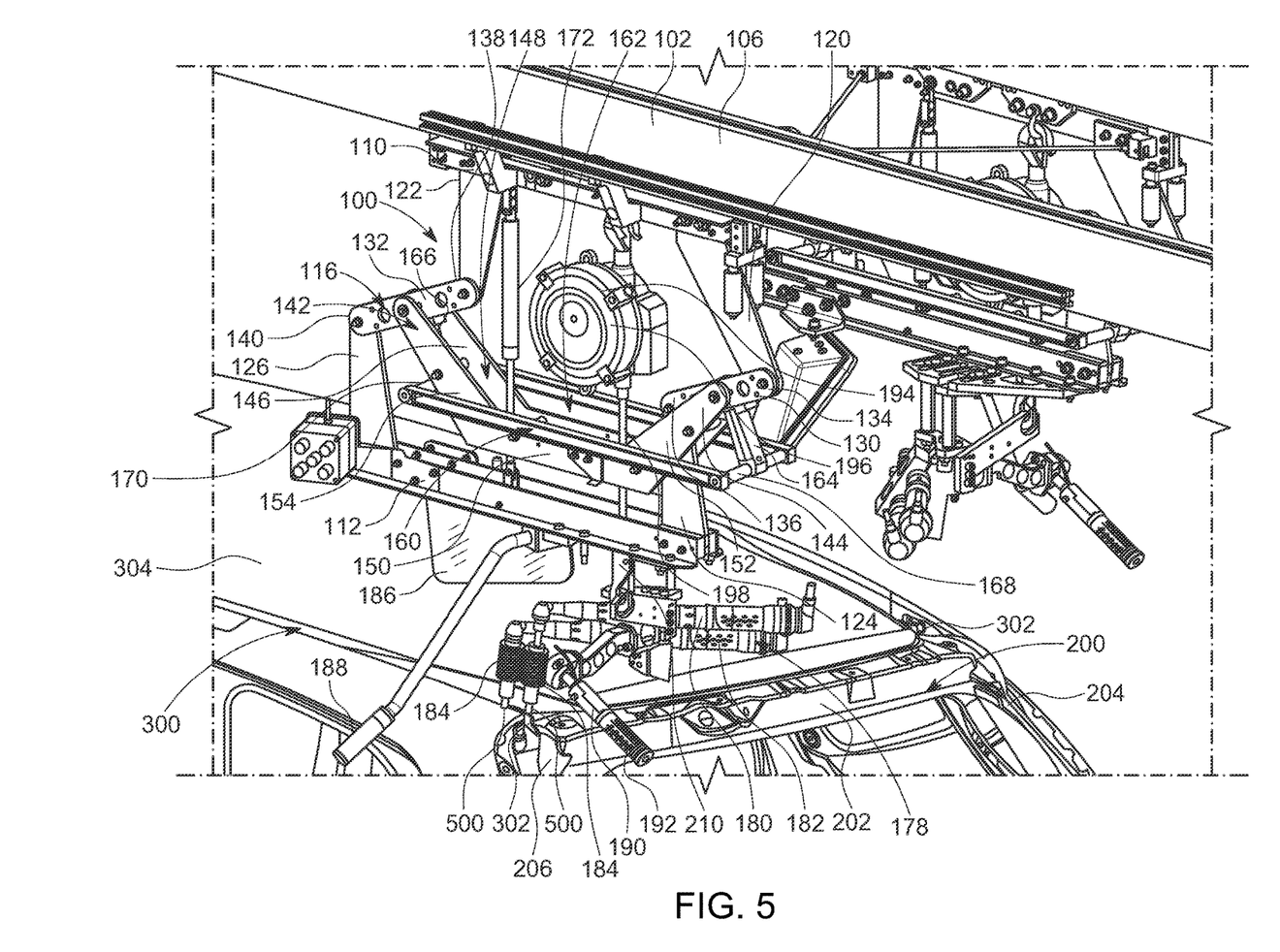
FIG. 5 is perspective view of a top rear portion of the car body and the tailgate arranged at the rear portion of the car body and depicting the tool assembly of FIG. 1 engaging the tailgate with the car body, in accordance with one embodiment of the disclosure.

Referring to FIGS. 1 and 5, a tool assembly 100 (shown in FIGS. 1 and 5) for installing a tailgate 200 to a car body 300 of a vehicle 400 at a manufacturing or assembling plant is shown. The tool assembly 100 is mounted to an overhead structure 102, for example, an overhead rail 106, and facilitates a coupling of one or more hinges 302 (best shown in FIG. 4) that are attached proximate to an upper end 202 of the tailgate 200 to a roof 304 of the car body 300. The tailgate 200 is configured to pivot relative to the car body 300 between an open position and a close position to selectively allow an access of an interior of the car body 300 via a rear opening of the car body 300. It may be appreciated that the car body 300 shown and contemplated is suitable for a hatchback, a sports utility vehicle (SUV), a multi utility vehicle (MUV), or any other suitable vehicle known in the art.

Figure 3:
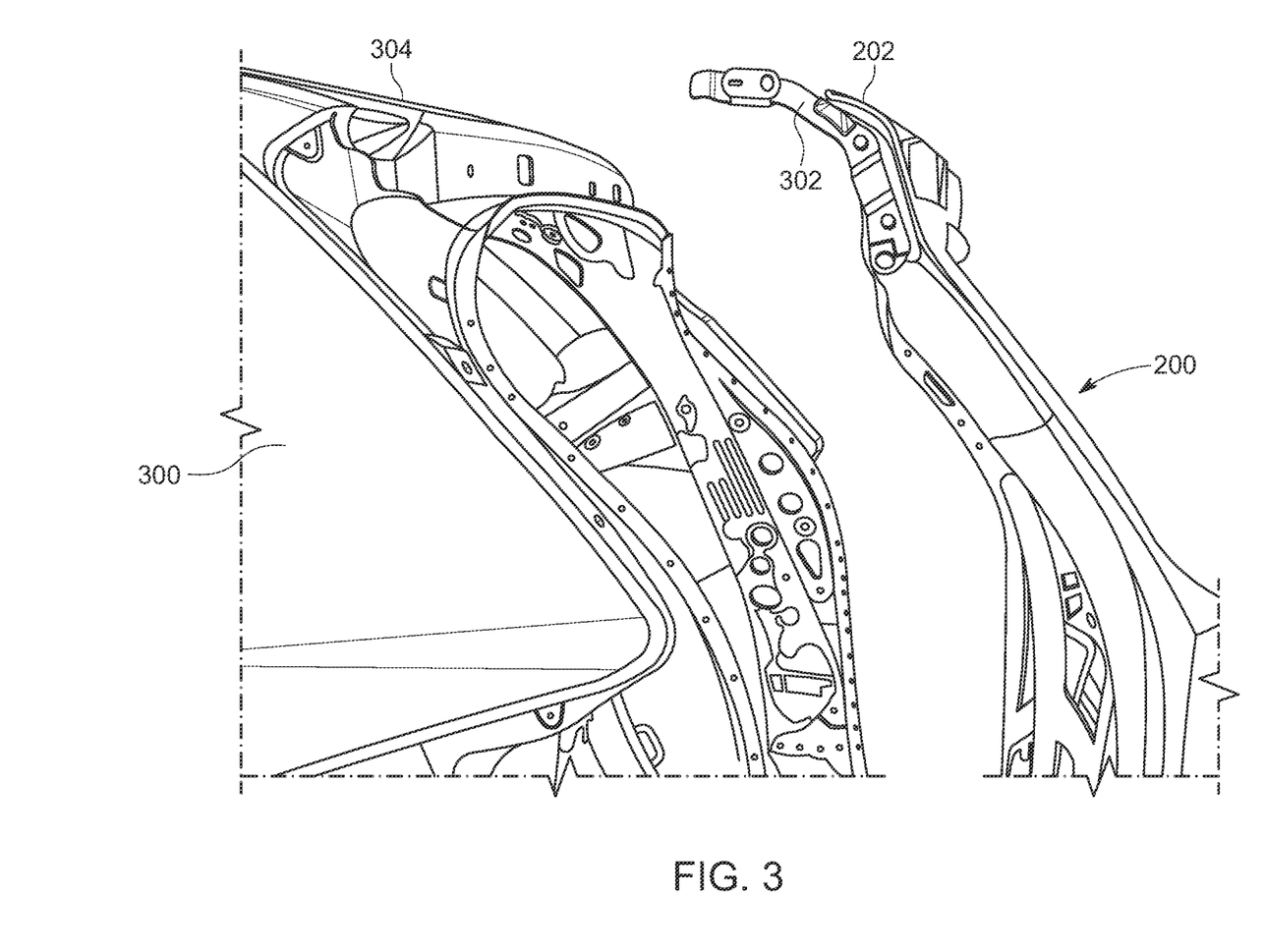
FIG. 3 illustrates a portion of a tailgate arranged spaced apart from a car body and having a hinge attached to the tailgate, in accordance with one embodiment of the disclosure.

As shown in FIGS. 3 to 5, the tailgate 200 is mounted to the car body 300 via two hinges 302 arranged proximate to the upper end 202 of the tailgate 200 with one hinge 302 connected to a first longitudinal side 204 of the tailgate 200, and the other hinge (not shown) connected to a second longitudinal side 206 of the tailgate 200. Further, each hinge 302 is connected to the car body 300 by using the fasteners, for example, a pair of bolts (shown in FIG. 1), with the help of the tool assembly 100.

As shown in FIGS. 1 and 5, the tool assembly 100 includes an elongated bracket 110 (i.e., mounting bracket 110) that is attached to the overhead rail 106, a frame 112 arranged substantially parallel to the bracket 110 and arranged spaced apart from the bracket, and a linkage mechanism 116 extending between the bracket 110 and the frame 112, and movably connecting the frame 112 with the bracket 110. The linkage mechanism 142 enables a vertical movement of the frame 112 relative to the bracket 110, while keeping the frame 112 parallel to the bracket 110.

The linkage mechanism 116 includes a pair of elongated members, for example, a first elongated member 120 (i.e., a first vertical member 120) fixedly attached to the bracket 110, and a second elongated member 122 (i.e., second vertical member 122) fixedly attached to the bracket 110. The first elongated member 120 and the second elongated member 122 are arranged spaced apart from each other and are connected to two opposite ends of the bracket 110. As shown, the first elongated member 120 and the second elongated member 122 extend vertically downwardly from the bracket 110 and towards the frame 112. Further, the linkage mechanism 116 includes a pair of elongated bars, for example, a first elongated bar 124 and a second elongated bar 126, extending vertically towards the bracket 110 from the frame 112 and fixedly connected to the frame 112. Accordingly, the pair of elongated members 120, 122 and the pair of elongated bars 124, 126 extends towards each other. The first elongated bar 124 and the second elongated bar 126 are arranged at opposite ends of the frame 112. Further, the first elongated member 120 is arranged offset from the first elongated bar 124 in a horizontal direction, while the second elongated member 122 is arranged offset from the second elongate bar 126 in the horizontal direction. Accordingly, the first elongated bar 124 is arranged outwardly of an end of the bracket 110, while the second elongated bar 126 is arranged inwardly of the other end of the bracket 110.

Additionally, the linkage mechanism 116 includes a first link 130 pivotally connected to the first elongated member 120 and the first elongated bar 124, and a second link 132 pivotally connected to the second elongated member 122 and the second elongated bar 126. As illustrated, the first elongated member 120 is pivotally coupled to a first end 134 (i.e., upper end 134) of the first link 130 and the first elongated bar 124 is pivotally coupled to a second end 136 (i.e., lower end 136) of the first link 130. Similarly, the second elongated member 122 is pivotally coupled to a first end 138 (i.e., upper end 138) of the second link 132, while the second elongated bar 126 is pivotally coupled to a second end 140 (i.e., lower end 140) of the second link 132.

Further, the linkage mechanism 116 includes a connector 142 connecting the first link 130 to the second link 132. As shown, the connector 142 includes a first connecting member 144 and a second connecting member 146 arranged spaced apart and substantially parallel to each other defining a gap 148 therebetween. As shown, the first link 130 and the second link 132, each is arranged between the first connecting member 144 and the second connecting member 146. Also, the first connecting member 144 and the second connecting member 146, each is connected to both the first link 130 and the second link 132. It may be appreciated that a structure and shape of the first connecting member 144 and the second connecting member 146 are similar, and for the sake of clarity and brevity, the structure and assembly of the first connecting member 144 is described.

As shown, the first connecting member 144 include a base 150 extending in a direction of the extension of the frame 112, and a pair of arms, for example, a first arm 152 extending obliquely outwardly and vertically from the base 150 towards the bracket 110 and a second arm 154 extending obliquely outwardly and vertically from the base 150 towards the bracket 110. The first arm 152 is arranged at a first end of the base 150 and is connected to the first link 130, while the second arm 154 is arranged at a second end of the base 150 and is connected to the second link 132. It may be appreciated the first arm 152 is connected substantially centrally to the first link 130, while the second arm 154 is connected substantially centrally to the second link 132. Accordingly, the first arm 152 is connected to the first link 130 at a location that lies between the connections of the first link 130 with the first elongated member 120 and the first elongated bar 124. Similarly, the second arm 154 is connected to the second link 132 at a location that lies between the locations of the connections of the second link 132 with the second elongated member 122 and the second elongated bar 124. Accordingly, the connector 142 enables a substantially vertical movement of the frame 112 relative to the bracket 110 in response to the pivoting of the first link 130 relative to the first elongated member 120 and the first elongated bar 124 and the second link 132 relative to the second elongated member 122 and the second elongated bar 126, keeping the frame 112 parallel to the bracket 110. It may be appreciated that as the frame 112 is moved downwardly relative to the bracket 110, the first link 130 pivots relative to the first elongated member 120 and the first elongated bar 124, while the second link 132 pivots relative to the second elongated member 122 and the second elongated bar 126. As the both the links 130, 132 are connected to the connector 142, the links 130, 132 pivots by the same angle, thereby keeping the frame 112 parallel to the bracket 110.

Also, the linkage mechanism 116 includes a ring structure 160 having a substantially rectangular shape defining a space 162. As shown, the ring structure 160 is coupled to the first link 130 and the second link 132 via a first extension member 164 and a second extension member 166. As shown, the first extension member 164 is attached/coupled to a first lateral member 168 of the ring structure 160, while the second extension member 166 is attached/coupled to a second lateral member 170 of the ring structure 160. The ring structure 160 moves in a direction substantially parallel to the extension of the overhead rail 106, as the frame 112 is moved vertically and the first link 130 and the second link pivots 132. The ring structure is arranged surrounding the connector 142 such that arms 152, 154 of the first connecting member 144 and the second connecting member 146 extend through the space 162 defined by the ring structure 160.

As shown, the tool assembly 100 includes a telescopic cylinder 172 extending vertically between the frame 112 and the bracket 110 and connected to the frame 112 and the bracket 110. The telescopic cylinder 172 may be spring based telescopic cylinder or a gas based telescopic cylinder and is biased to a retracted position, causing a retraction of the frame 112 towards the bracket 110 when a downward force applied on the frame 112 by a technician is released. The telescopic cylinder 172 is adapted to extend when the frame 112 is moved downwardly by the technician to engage the fasteners, for example, bolts 500, with the car body 300 and the hinge 302 attached to the tailgate 200.

Figure 2:
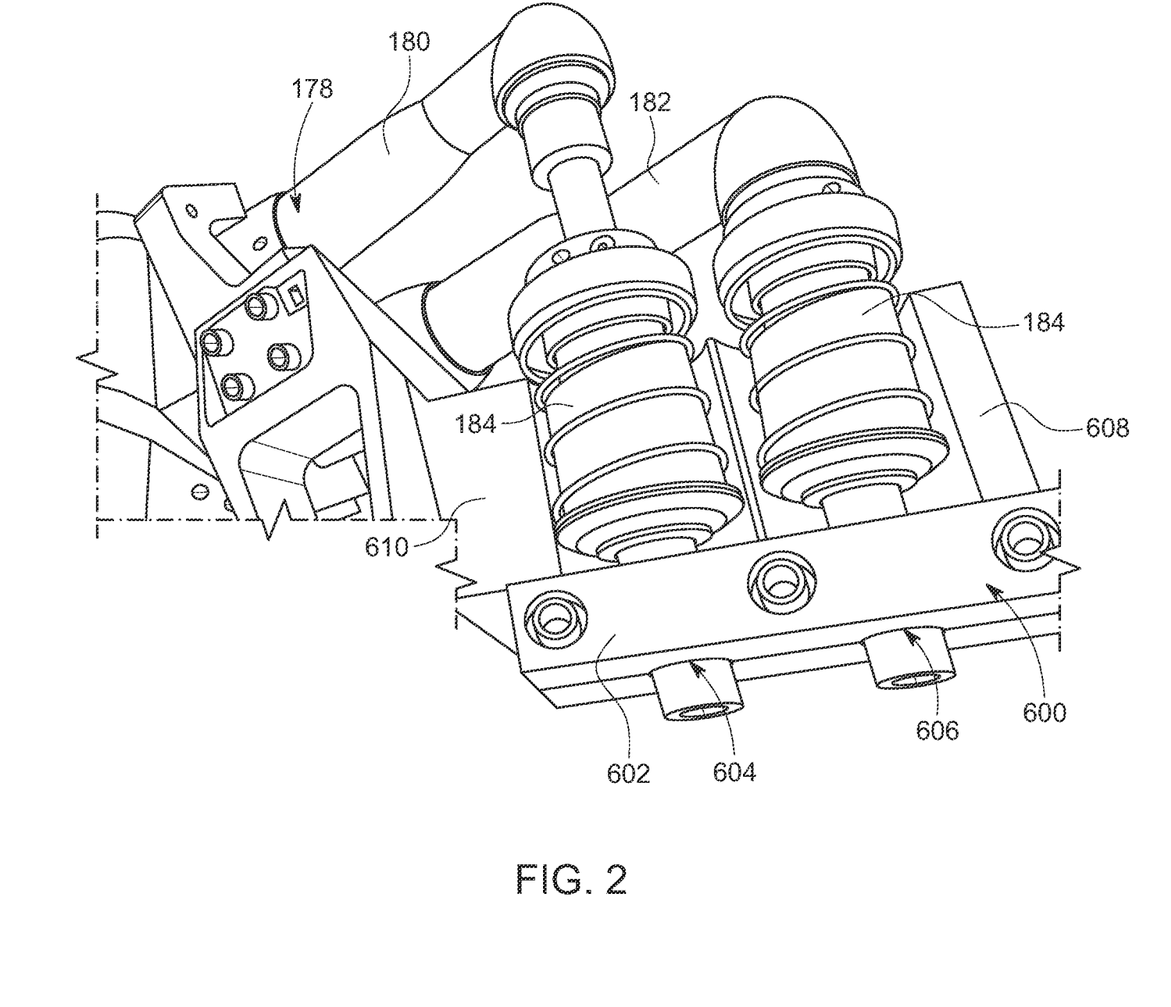
FIG. 2 is an enlarged perspective view a gun assembly of the tool assembly depicting a jig attached to a pair of sockets, in accordance with one embodiment of the disclosure.

Additionally, the tool assembly 100 includes a gun assembly 178 having a pair of torque guns 180, 182 attached/coupled/engaged to the frame 112 and configured to hold the pair of bolts 500 simultaneously and engage and tighten the pair of bolts 500 to the car body 300 and the hinge 302 to connect/attached the hinge 302, and hence tailgate 200, with the car body 300. In an embodiment, a socket 184 of the gun assembly 178 is arranged at an end of each of the guns 180, 182 to facilitate a holding of the bolt 500. In an embodiment, the socket 184 may include a magnetic holder (not shown) to magnetically hold the bolt 500. Also, the socket 184 is a spring-loaded socket 184 adapted to be disengaged from the associated bolt 500 once the bolt 500 is fastened to the hinge 302 and the car body 300. A spring of the socket 184 facilitates the disengagement of the associated bolt 500 from the socket 184 after engagement of the bolt 500 with the hinge 302 and the car body 300. The sockets 184 are adapted to retain and hold the bolts 500 with respective guns 180, 182 to facilitate an insertion of the bolts 500 through the holes of the hinge 302 and the car body 300 as the guns 180, 182 are lowered and moved to engage the hinge 302 with the car body 300. Additionally, or optionally, the tool assembly 100 may include a jig 600 (as shown in FIG. 2) adapted to engage with the pair of sockets 184 to hold the sockets 184 together so as to keep the relative distance between the two sockets 184 fixed and also to keep the relative orientation of the sockets 184 unchanged during operation of the tool assembly 100. As shown, the jig 600 may include a base body 602 having a pair of holes 604, 606 to receive the pair of sockets 184, a first wall structure 608 extending substantially vertically to the base body 602 and arranged at a first side of the base body 602, and a second wall structure 610 extending vertically from the base body 602 and engaged with the guns 180, 182. The second wall structure 610 is arranged at second side of the base body 602 such that the sockets 184 are arranged between the first wall structure 608 and the second wall structure 610 in the assembly of the jig 600 with the sockets 184.

Additionally, the tool assembly 100 includes a mirror 186 engaged to the frame 112 and configured to provide a view of the holes of hinge 302 and the car body 300 as well as the bolts 500 that are retained inside the sockets 184 to enable an alignment of the bolts 500 with the hinge 302 and the car body 300 to facilitate a proper insertion of the bolts 500 inside the aligned holes of the hinge 302 and the car body 300. Thereafter, the technician operates the guns 180, 182 to tighten the bolts 500, securing the hinge 302, and hence the tailgate 200 with the car body 300.

Further, to move or pull the frame 112, hence the torque guns 180, 182 to a suitable location for inserting and engaging the bolts 500 with the hinge 302 and the car body 300, and attach the tailgate 200 with the car body 300, the tool assembly 100 includes a handle 188 attached to the frame 112. Accordingly, for mounting of the tailgate 200 to the car body 300, the technician moves the frame 112 to the suitable location by holding the handle 188 with one hand, and operates/actuates the pair of guns 180, 182 using the other hand. As shown, the tool assembly 100 includes a lever 190 to move and operate the pair of guns 180, 182 simultaneously. For operating/actuating the guns 180, 182, a grip 192 is arranged surrounding a portion of the lever 190. The grip 192 is adapted to rotate relative to the lever 190 and the guns 180, 182 are actuated to rotate the bolts 500 in response to the rotation of the grip 192 relative to the lever 190.

Also, the tool assembly 100 may include a balancer 194, for example, a winch 196, connected to the bracket 110. As shown, the winch includes a cable 198 that is connected to the gun assembly 178 to facilitate to maintain a relative orientation of the pair of guns 180, 182 of the gun assembly 178 with the frame 112. The cable 198 is adapted to extend and retract along with the downward and upward movement of the frame 112. Moreover, the tool assembly 100 may include a sensor 210 to determine/detect a slackness of the cable 198. Based on the determination of the slackness of the cable 198, a motor or actuator (not shown) of the balancer 194 is operated/actuated to retract the cable 198.

A method for assembly the tailgate with the car body is now described. The method includes, at first, attaching the pair of hinges 302 with the tailgate 200. For so doing, the technician engages one hinge 302 to the upper end 202 of the tailgate 200 and proximate to the first longitudinal side 204 of the tailgate 200, and attaches the other hinge 302 to the upper end 202 and proximate to the second longitudinal side 206 of the tailgate 200, as shown in FIG. 3. Upon engaging/attaching the hinges 302 with the tailgate 200, one or more technician positions/arrange the tailgate 200 covering the rear opening of the car body 300 (as shown in FIG. 4), and temporarily secures the tailgate 200 with the car body 300 using a suitable fixture (not shown). In this manner, the tailgate 200 with the hinges 302 may be positioned at the rear opening of the car body 300 in the desired alignment such that a gap between the tailgate 200 and the car body 300 on a right side is substantially equal to gap between the tailgate 200 and the car body 300 on a left side.

Thereafter, the technician aligns the hinges 302 with the car body 300 such that the holes of the hinges 302 are arranged with the respective holes of the car body 300. Subsequently, the technician engages the hinges 302 with the car body 300 using the tool assembly 100, as shown in FIG. 5. For so doing, the technician operates the tool assembly 100 by holding the handle 188 and the lever 190, and aligns the bolts 500 held in the sockets 184 of the guns 180, 182 with the aligned holes of the hinge 302 and the car body 300. For aligning the bolts 500 with the holes of the hinge 302 and the car body 300, the technician uses the mirror 186 to view the holes and the bolts 500, and move the gun assembly 178 accordingly by using the lever 190. Once the bolts 500 are aligned with the aligned holes of the hinge 302 and the car body 300, the technician inserts the bolts 500 inside the respective holes, and rotates the grip 192 to rotate the bolts 500 to fasten the bolts 500 with the hinge 302 and the car body 300, thereby securing/attaching the hinge 302, and hence the tailgate 200 with the car body 300. As the tailgate 200 is attached to the car body 300 after engaging the hinges 302 with the tailgate 200, the tailgate can be aligned properly with the car body 300 such that the tailgate 200 is arranged at a desired position, minimizing any lateral or longitudinal deviation of the tailgate 200 from the desired position relative to the car body 300.

What is claimed is:

1. A tool assembly for mounting a tailgate to a car body, the tool assembly comprises:
   a bracket adapted to engage with an overhead structure;
   a frame movably coupled to the bracket and configured to move in a vertical direction relative to the bracket;
   a linkage mechanism movably coupling the frame with the bracket, wherein the linkage mechanism is configured to maintain the frame parallel to the bracket during the vertical movement of the frame;
   a balancer coupled to the bracket and including a cable coupled to a pair of torque guns; and
   the pair of torque guns coupled to the frame and configured to hold a pair of fasteners, wherein the pair of torque guns engages and tightens the pair of fasteners to the car body and a hinge attached to the tailgate.

2. The tool assembly of claim 1 further a mirror attached to the frame and configured provide a view of the hinge, the car body and the pair of fasteners to facilitate an alignment of the pair of fasteners with the hinge and the car body to enable the engagement of the pair of fasteners with the hinge and the car body.

3. The tool assembly of claim 1, wherein linkage mechanism includes
   a pair of elongated members coupled to the bracket,
   a pair of elongated bars coupled to the frame, and
   a pair of links pivotally coupled to the pair of elongated members with the pair of elongated bars.

4. The tool assembly of claim 3, wherein the linkage mechanism includes a connector connecting the pair of links together.

5. The tool assembly of claim 1 further including a telescopic cylinder connected to the bracket and the frame and biased to a retracted position.

6. The tool assembly of claim 1 further including a pair of sockets arranged at ends of the pair of torque guns and configured to hold the pair of fasteners.

7. The tool assembly of claim 6, wherein each of the pair of sockets is a spring-loaded socket.

8. A tool assembly for mounting a tailgate to a car body, the tool assembly comprises:
   a bracket adapted to engage with an overhead structure;
   a frame movably coupled to the bracket and configured to move in a vertical direction relative to the bracket;
   a linkage mechanism movably coupling the frame with the bracket, wherein the linkage mechanism is configured to maintain the frame parallel to the bracket during the vertical movement of the frame;
   a pair of torque guns coupled to the frame and configured to hold a pair of fasteners, wherein the pair of torque guns engages and tighten the pair of fasteners with the car body and a hinge attached to the tailgate; and
   a mirror attached to the frame and configured provide a view of the hinge, the car body and the pair of fasteners to facilitate an alignment of the pair of fasteners with the hinge and the car body to enable the engagement of the pair of fasteners with the hinge and the car body.

9. The tool assembly of claim 8, wherein linkage mechanism includes
   a pair of elongated members coupled to the bracket,
   a pair of elongated bars coupled to the frame, and
   a pair of links pivotally coupled to the pair of elongated members with the pair of elongated bars.

10. The tool assembly of claim 9, wherein the linkage mechanism includes a connector connecting the pair of links together.

11. The tool assembly of claim 8 further including a telescopic cylinder connected to the bracket and the frame and biased to a retracted position.

12. The tool assembly of claim 8 further including a pair of sockets arranged at ends of the pair of torque guns and configured to hold the pair of fasteners.

13. The tool assembly of claim 12, wherein each of the pair of sockets is a spring-loaded socket.

14. The tool assembly of claim 13 further including a balancer coupled to the bracket and including a cable coupled to the pair of torque guns.

15. The tool assembly of claim 14 further including a sensor adapted to detect a slackness in the cable, wherein the balancer is configured to retract the cable in response to the detection of the slackness in the cable.

* * * * *